Figure 1:
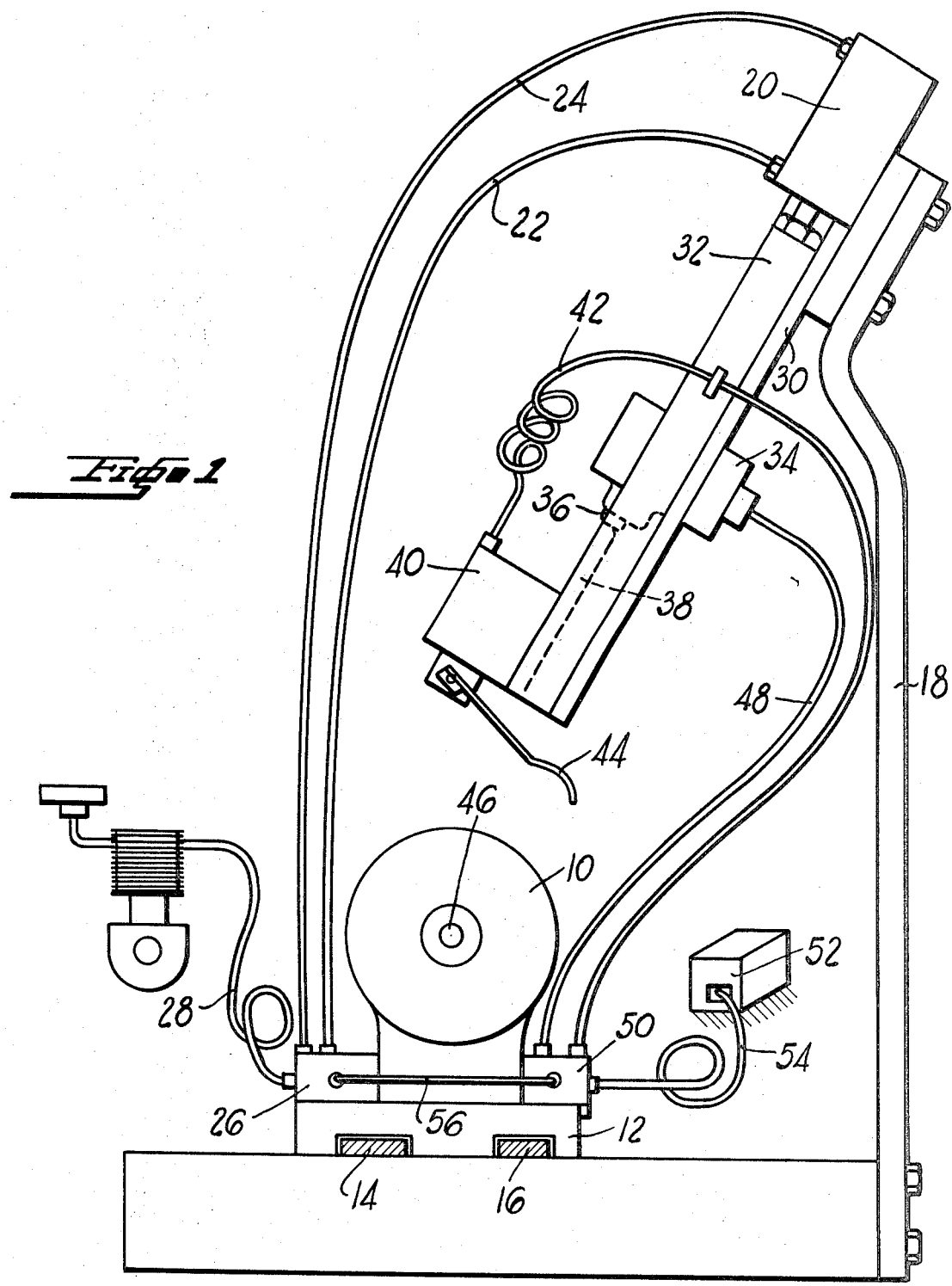

United States Patent

[11] 3,575,518

| [72] | Inventor | Horst Waldmann<br>St. Joseph, Mich. |
|---|---|---|
| [21] | Appl. No. | 786,098 |
| [22] | Filed | Dec. 23, 1968 |
| [45] | Patented | Apr. 20, 1971 |
| [73] | Assignee | The Bendix Corporation |

[54] TOOL PROBE
4 Claims, 2 Drawing Figs.

[52] U.S. Cl. .................................................. 408/6,
340/267
[51] Int. Cl. .................................................. B23b 49/00
[50] Field of Search .......................................... 77/5.2;
200/61.41, 61.42; 340/267

[56] References Cited
UNITED STATES PATENTS
3,301,100  1/1967  Hubeny ........................ 77/5

Primary Examiner—Francis S. Husar
Attorneys—Richard G. Geib and Plante, Arens, Hartz, Hix & Smith ABSTRACT: A detector for sensing the condition of a tool member to control the operation of a machine. A probe member operated by a motor is connected to a first electrical relay. When the probe member contacts the tool member, a second relay is activated to close a switch controlling the operation of the machine. The operation of the machine is delayed until the first relay has operated the motor to move the probe away from the tool member.

INVENTOR.
HORST WALDMANN

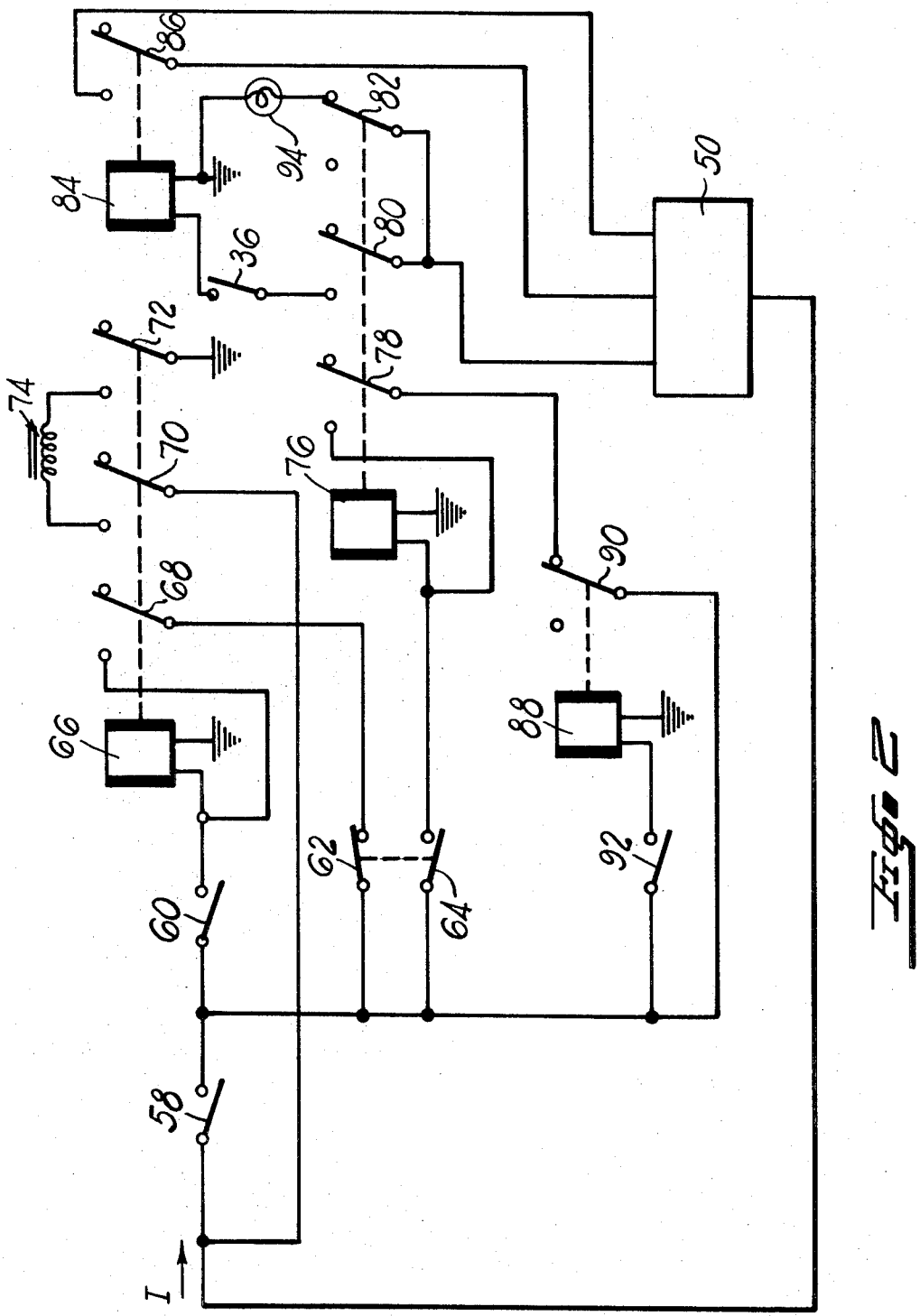

3,575,518

TOOL PROBE

As has been stated in U.S. Pat. No. 2,953,044, it is important to determine in automated machine tooling whether or not an adequate tool is available to perform the work desired. In that the operator of such machines is generally required to utilize a majority of his time making sure that it is supplied with the necessary items to be machined, he has limited time available for checking the various tools that are located on the machine. Therefore, it is principal object of this invention to provide a simplified electrical tool detecting means interposed in the electrical circuitry of the machine so that, whenever a broken tool is detected, staging of the machine and further work is curtailed until the broken tool is replaced and the machine reinstated for operation by the operator.

It is a more particular object of this invention to interpose an electrical means of switches and relays connected with a probing means that is automatically operated to detect the presence of a good or bad tool to perform the functions aforementioned.

Other objects and advantages will appear from the following description of the drawings in which:

FIG. 1 shows a view of a tool detector in a form presently employed in accordance with the principles of this invention; and FIG. 2 is an electrical circuit diagram for the tool detector means of FIG. 1.

With more particular regard to FIG. 1 there is shown a drill motor 10 mounted on a carriage 12 reciprocable on tracks 14 and 16 towards a workpiece held in a fixture of a machine (not shown) which is provided with a plurality of work stations staged by revolution. A vertical mount 18 is attached to the table 12 to which is mounted an air motor 20 connected by fluid conduits 22 and 24 to an air solenoid valve 26. A source of air normally available in the factory is connected to solenoid valve 26 by a conduit 28.

A sliding support 30 is also connected to the mount 18 along which a sliding carriage 32 is reciprocated by motor 20. A switching means 34 is carried by the support 30 and has a switch button 36 adapted for operation by an arm 38 connected to a switch 40 carried by carriage 32. Electrical leads 42 connect switches 34 and 40. To switch 40 a pivotable probe 44 is connected for abutment on a drill tip 46 whenever the motor 20 reciprocates the actuator 32 towards the drill tip 46. Electrical source for the switches 34 and 40 is provided by lead 48 from master control box 50 connected to an electrical source 52 by lead 54, and to machine indexing mechanism as by an electrical lead 56.

It should be understood by those skilled in the art that the machine to which applicant addresses this invention is capable of manual and automatic operation therefore, it should be appreciated that the probe or tool detector in accordance with the principles of this invention is adapted to be specifically useable with respect to automatic operation of the associated machine.

With reference to FIG. 2 there is shown in electrical circuitry which has been utilized whereby a switch 58 is provided to close the electrical circuitry for the tool detector whenever the machine is placed in automatic operation. Another switch 60 is provided to be operated whenever an impulse is generated by the staging of the machine to revolve its work table and place an article to be machined in alignment with the drill 46. This will cause the energization of the electrical system within switch 40 in that there is provided therein a normally closed switch 62 mechanically linked to a normally open switch 64. The completion of the circuit to normally closed switch 62 energizes a relay 66 such that its normally open switches 68, 70 and 72 are closed to energize air solenoid coil 74 and operate motor 20. When the probe 44 contacts the drill, switch 64 will close to energize a relay 76 and close its normally open contacts 78 and 80 and open its normally closed contact 82 all of which are within the switch mechanism 34 of FIG. 1. Also within this switch mechanism there is another relay 84 connected via switch 34 to one pole of the normally open switch 80 to be energized upon closing of switch 80 so that its normally open switch 86 can close to provide a signal for a drill advance mechanism contained in master control box 50. In addition, still another relay 88 is provided in the switching mechanism 34 having a normally closed switch 90 connected between the electrical source and relay 76 which is controlled by means of a normally open switch 92 linked to a stop means on the carriage (not shown) that signals whenever drill 46 reaches its full depth to thereby deenergize relay 76.

OPERATION

It may be readily appreciated from the foregoing that when the machine, not shown, indexes, relay 66 is energized. Relay 66 stays energized through the normally open contact 68 and the normally closed switch 62 controlled by probe 44. With relay 66 energized, the air solenoid 74 energizes to activate motor 20 and bring the probe 44 adjacent drill 46. With a good drill 46 being present, switch 64 will be closed to energize relay 76, and at the same, open switch 62 to deenergize relay 66. Relay 76 stays energized then through normally open contact 78 being closed by the relay 76 and because of the normally closed contact 90 for the relay 88.

As relay 66 has been deenergized, the air solenoid 74 is deenergized by the return of the contacts 68, 70 and 72 to their normally open status thereby motor 20 is then returned to its rest position withdrawing probe 44 from the area of the drill motor 10. Upon return of the actuator 32 the leg 38 of switch 40 closes switch 36 to activate relay 84 closing its normally open contact 86 to provide a signal for control 50 that will start the drill motor 10 to move forward to perform the necessary drilling operation. As the drill reaches its scheduled depth in the workpiece, switch 92 will be closed to energize relay 88 and open switch 90 to deenergize relay 76 whereby the electrical network of switches 34 and 40 is reset for the next machine cycling.

In case of a broken drill, switch 64 will not be actuated, therefore, relay 76 cannot energize and the circuit for the drill forward signal is not able to be completed. Thus, drill 46 will not go forward and within control 50 there is electrical circuitry provided to stop all of the machine function and complete the electrical circuit to indicator 94 via normally closed switch 82 thereby telling the operator visually of a tool defect.

I claim:

1. For use with a machine having a tool member with a plurality of programmed operational positions, means for sensing the condition of such tool member after each operational position to control energization of said machine, such means comprising:
    a motor;
    first electrical means having a first relay electrically connected to said motor for supplying energy thereto;
    a probe member moved by said motor; and
    second electrical means having a first switch and a second switch, said probe member opening said first switch and closing said second switch upon sensing the condition of such tool member, said first switch being connected to said first electrical means, said first electrical means upon opening of said first switch causing said motor to remove said probe member from contact with such tool member, said second switch upon closing activating a second relay member causing a signal to be generated for operating such machine in one of such programmed operational positions, said first electrical means receiving a signal at the end of each staged work position to reset said first electrical means in an operational position.

2. The tool member, as recited in claim 1, wherein said second relay member includes:
    a first contact member;
    a second contact member electrically connected to a third relay which closes a contact to transmit said operational signal to such machine; and a third contact member electrically connected to an indicator to provide an operator with a visual indication of the condition of such tool member.

3. The tool member, as recited in claim 2, wherein said second electrical means includes:
- a fourth relay electrically connected to said first contact member and such machine, said fourth relay causing said operational signal to such machine to be interrupted at the end of each work position and resetting said first electrical means to an operational position.

4. A detector for determining the condition of a machine tool, said detector comprising:
- a housing;
- a motor located in said housing;
- a tool probe movable in response to said motor to contact a tool;
- switch means electrically connected to such machine tool;
- first relay means electrically connected to said motor for controlling movement of said tool probe; and
- second relay means electrically connected to said switch means and said first relay means, said tool probe upon detecting the condition of such tool opening said first relay means and closing said second relay means, said second relay means activating said switch means for controlling cycling of such machine tool after said first relay means has operated said motor to deactivate said tool probe from such tool.